US012644586B2

(12) United States Patent
Fan et al.

(10) Patent No.: US 12,644,586 B2
(45) Date of Patent: Jun. 2, 2026

(54) ADJUSTABLE LAMP WITH SLIDING OPERATOR

(71) Applicant: FOSHAN ELECTRICAL AND LIGHTING CO., LTD., Foshan (CN)

(72) Inventors: Shijun Fan, Foshan (CN); Xiaofei Liu, Foshan (CN); Yong Zhang, Foshan (CN); Fuguo Huang, Foshan (CN); Jiabin Zeng, Foshan (CN); Yi Yang, Foshan (CN)

(73) Assignee: FOSHAN ELECTRICAL AND LIGHTING CO., LTD., Foshan (CN)

( * ) Notice: Subject to any disclaimer, the term of this patent is extended or adjusted under 35 U.S.C. 154(b) by 0 days.

(21) Appl. No.: 18/948,597

(22) Filed: Nov. 15, 2024

(65) Prior Publication Data

US 2025/0305664 A1 Oct. 2, 2025

(30) Foreign Application Priority Data

Mar. 28, 2024 (CN) ......................... 202410367720.5

(51) Int. Cl.
*F21V 23/04* (2006.01)
*F21V 3/00* (2015.01)
*F21V 17/12* (2006.01)

(52) U.S. Cl.
CPC ................ *F21V 23/04* (2013.01); *F21V 3/00* (2013.01); *F21V 17/12* (2013.01)

(58) Field of Classification Search
CPC . F21V 23/04; F21V 17/12; F21K 9/23; H01H 1/365; H01H 1/36; H01H 15/00; H01H 15/005; H01H 15/06; H01H 19/001; H01H 21/18
See application file for complete search history.

(56) References Cited

U.S. PATENT DOCUMENTS

| | | | | |
|---|---|---|---|---|
| 6,149,283 A * | 11/2000 | Conway | F21S 10/02 | 362/249.05 |
| 8,960,988 B2 * | 2/2015 | Chien | F21V 23/0407 | 340/472 |
| 10,893,587 B2 * | 1/2021 | Halliwell | F21K 9/238 | |
| 11,248,753 B1 * | 2/2022 | Li | F21K 9/232 | |
| 11,320,128 B2 * | 5/2022 | Wang | A01G 9/249 | |
| 11,326,766 B2 * | 5/2022 | Li | F21K 9/235 | |
| 12,352,393 B2 * | 7/2025 | Xu | F21V 31/00 | |

(Continued)

FOREIGN PATENT DOCUMENTS

| | | |
|---|---|---|
| CN | 106287363 A | 1/2017 |
| CN | 220038384 U | 11/2023 |
| JP | 2015065181 A | 4/2015 |

OTHER PUBLICATIONS

Extended European search report issued in corresponding European application No. 24218902.5 dated Jun. 20, 2025.

*Primary Examiner* — Ismael Negron

(57) ABSTRACT

The lamp, includes a housing body, a light source assembly having a light source provided on a plate, a plurality of connecting contacts provided on the plate, a dial member slidably connected to the housing body, and a contact member received in the dial member. The dial member is condigured to drive the contact member to slide between the different connecting contacts. The contact member includes an insertion portion, a fixing portion, a contact sheet, and a connecting sheet.

20 Claims, 4 Drawing Sheets

(56) References Cited

U.S. PATENT DOCUMENTS

| | | | | |
|---|---|---|---|---|
| 2002/0071279 | A1* | 6/2002 | Katogi | H05B 45/20 362/317 |
| 2011/0163668 | A1* | 7/2011 | Jonsson | H05B 47/19 315/129 |
| 2015/0061497 | A1* | 3/2015 | Martins | H05B 45/10 315/291 |
| 2020/0187319 | A1* | 6/2020 | Jiang | F21V 23/006 |
| 2024/0077190 | A1* | 3/2024 | Wu | F21V 19/0045 |
| 2025/0207741 | A1* | 6/2025 | Wu | F21V 23/04 |

* cited by examiner

ADJUSTABLE LAMP WITH SLIDING OPERATOR

CROSS REFERENCE TO RELATED APPLICATIONS

The present application claims the benefit of Chinese Patent Application No. 202410367720.5 filed on Mar. 28, 2024, the contents of which are incorporated herein by reference in their entirety.

TECHNICAL FIELD

The present disclosure relates to the technical field of lamps, and in particular, to a dial sheet-based dimming lamp.

BACKGROUND

In existing lamps, color temperature adjustment devices are usually employed to adjust different color temperatures of lamps to meet the adjustment needs of users. The existing color temperature adjustment device generally includes a dial sheet and a dial switch. The dial sheet is a sliding mechanism, is connected to the dial switch, and can slide. A plurality of wiring terminals and a wiring base are provided in the dial switch, a plurality of energizing terminals are provided on the wiring base, and the wiring terminals and the energizing terminals all protrude outwards. The wiring terminals can be connected to the energizing terminals to supply power to a light source, and the dial sheet can drive the wiring terminals to move, such that the wiring terminals are connected to different energizing terminals, and a current input into the light source changes to achieve the effect of color temperature adjustment. To ensure that there is enough space for the wiring terminals and the energizing terminals to connect and the wiring terminals can move freely, the existing dial switch is large in volume and complex in internal structure and can be assembled with precise layout design and high assembly accuracy, which increases the difficulty of production and assembly.

SUMMARY

The technical problem to be solved by the present disclosure is to provide a dial sheet-based dimming lamp, which can reduce the overall volume and is simple in structure and convenient to mount.

To solve the above technical problem, the present disclosure provides a dial sheet-based dimming lamp, including a housing, a light source assembly provided in the housing, and an adjustment assembly connected to the light source assembly, where the housing includes a housing body; the light source assembly includes a light source plate and a light source provided on the light source plate;

the adjustment assembly includes a dial member and a contact member; the dial member is slidably connected to the housing body; the contact member is connected to the dial member; the contact member abuts against the light source plate; connecting contacts are provided on the light source plate; the contact member can be in contact with the connecting contacts; and the dial member can drive the contact member to slide between the different connecting contacts.

As an improvement to the above solution, the contact member is an elastic sheet, and the contact member is inserted on the dial member.

As an improvement to the above solution, the contact member is provided with sliding contacts, and the sliding contacts can be in contact with the connecting contacts.

As an improvement to the above solution, the dial member includes a connecting portion, the contact member is provided with an insertion portion, the connecting portion is provided with a connecting hole, and the insertion portion can be inserted into the connecting hole.

As an improvement to the above solution, two sides of the insertion portion are each provided with a limiting sheet, the limiting sheet has one end connected to the insertion portion and the other end extending obliquely towards an outer side of the connecting hole and towards an outer side of the insertion portion, an inclined surface is provided in an opening at one end of the connecting hole, an inclination direction of the inclined surface is the same as an inclination direction of the limiting sheet, and one end of the limiting sheet can abut against an end of the connecting portion away from the inclined surface.

As an improvement to the above solution, a sliding hole is formed in the light source plate, a length direction of the sliding hole is parallel to a surface of the light source plate, and the connecting portion can be inserted into the sliding hole and slide in the sliding hole.

As an improvement to the above solution, the dial member further includes a dial sheet portion, and the dial sheet portion has one end connected to the connecting portion and the other end protruding towards an outer side of the housing body.

As an improvement to the above solution, an adjustment hole is formed in a side wall of the housing body, a length direction of the adjustment hole is parallel to the length direction of the sliding hole, the dial sheet portion passes through the adjustment hole and protrudes from the outer side wall of the housing body, and the connecting portion moves on the surface of the light source plate.

As an improvement to the above solution, a limiting piece is further provided on the mounting stage, a limiting groove is formed in the light source plate, and the limiting piece can be inserted into the limiting groove.

As an improvement to the above solution, the dial member further includes a guide rod, the guide rod is disposed at an end of the dial sheet portion located in the housing body, a shape of the guide rod corresponds to a shape of an inner side wall of the housing body, aside portion of the guide rod abuts against the inner side wall of the housing body, and the guide rod can slide along the inner side wall of the housing body.

As an improvement to the above solution, the connecting portion is provided with a first limiting plate and a second limiting plate, the first limiting plate and the second limiting plate protrude from a surface of the connecting portion, the first limiting plate is located on aside of the connecting hole close to a center of the housing body, and the second limiting plate is located on a side of the connecting hole away from the center of the housing body.

As an improvement to the above solution, the first limiting plate and the second limiting plate can be inserted into the sliding hole, the first limiting plate and the second limiting plate respectively abut against two opposite sides of the sliding hole, and the first limiting plate and the second limiting plate can slide in the sliding hole.

As an improvement to the above solution, a first buckling stage is provided at a tail end of the first limiting plate, the first buckling stage protrudes towards a direction away from the connecting hole and is inclined from aside away from the center of the housing body to aside close to the center of the housing body, a second buckling stage is provided at a tail end of the second limiting plate, the second buckling stage protrudes towards the direction away from the connecting hole and is inclined from aside close to the center of the housing body to aside away from the center of the housing body, and the first buckling stage and the second buckling stage can both abut against the surface of the light source plate.

As an improvement to the above solution, the contact member further includes a fixing portion, the insertion portion is located at a tail end of the fixing portion, a limiting boss is provided at a side portion of the fixing portion, and the limiting boss protrudes outwards and can abut against the inside of the connecting hole.

As an improvement to the above solution, the contact member further includes a contact sheet and a connecting sheet; the contact sheet is connected to the fixing portion through the connecting sheet; the sliding contacts are disposed on the contact sheet; the sliding contacts include a first movable contact and a second movable contact; a plurality of groups of connecting contacts are provided on the light source plate; each group of connecting contacts includes a first fixed contact and a second fixed contact; when the first movable contact is in contact with the first fixed contact, the second movable contact is connected to the second fixed contact; and when the first movable contact is in contact with the second fixed contact, the second movable contact is in contact with the first fixed contact.

As an improvement to the above solution, the first fixed contact and the second fixed contact are distributed on a same side of the sliding hole, and the first movable contact and the second movable contact are respectively disposed on two sides of a same end of the connecting sheet.

As an improvement to the above solution, a mounting stage is provided on the inner side wall of the housing body, the light source plate is fixed on the mounting stage, a limiting piece is further provided on the mounting stage, a limiting groove is formed in the light source plate, and the limiting piece can be inserted into the limiting groove.

As an improvement to the above solution, the housing further includes a lampshade and a threaded cylinder, the lampshade is connected to one end of the housing body, and the threaded cylinder is connected to the other end of the housing body.

Implementing the present disclosure has the following beneficial effects:

The dial sheet-based dimming lamp of the present disclosure is provided with a housing, a light source assembly, and an adjustment assembly, where the light source assembly includes a light source plate and a light source; the housing includes a housing body; the light source plate is connected to the housing body; the adjustment assembly includes a dial member and a contact member; the dial member is slidably connected to the light source plate; the dial member can slide relative to the housing body, and can drive the contact member to slide between connecting contacts of the light source plate in the sliding process; the connecting contacts are connected to a power supply mechanism; the contact member can be in contact with different connecting contacts; and since different connecting contacts have different power supply currents, the light exit effect of the light source can be adjusted. In a mode of changing contacts by sliding, the structure is simple, the contacts are provided on the light source plate, and there is no protruding structure, such that the overall structure can be simplified, and the overall space can be reduced. Moreover, it is easier to connect the dial member and the contact member, so the advantage of mounting convenience is also achieved.

DETAILED DESCRIPTION

To make the objectives, technical solutions, and advantages of the present disclosure more clear, the present disclosure will be further described in detail below with reference to the accompanying drawings. It should be noted that orientation terms such as "upper", "lower", "left", "right", "front", "rear", "inner", and "outer" that appear or are about to appear in the present disclosure are only based on the accompanying drawings of the present disclosure, and do not specifically limit the present disclosure.

Figure 1:
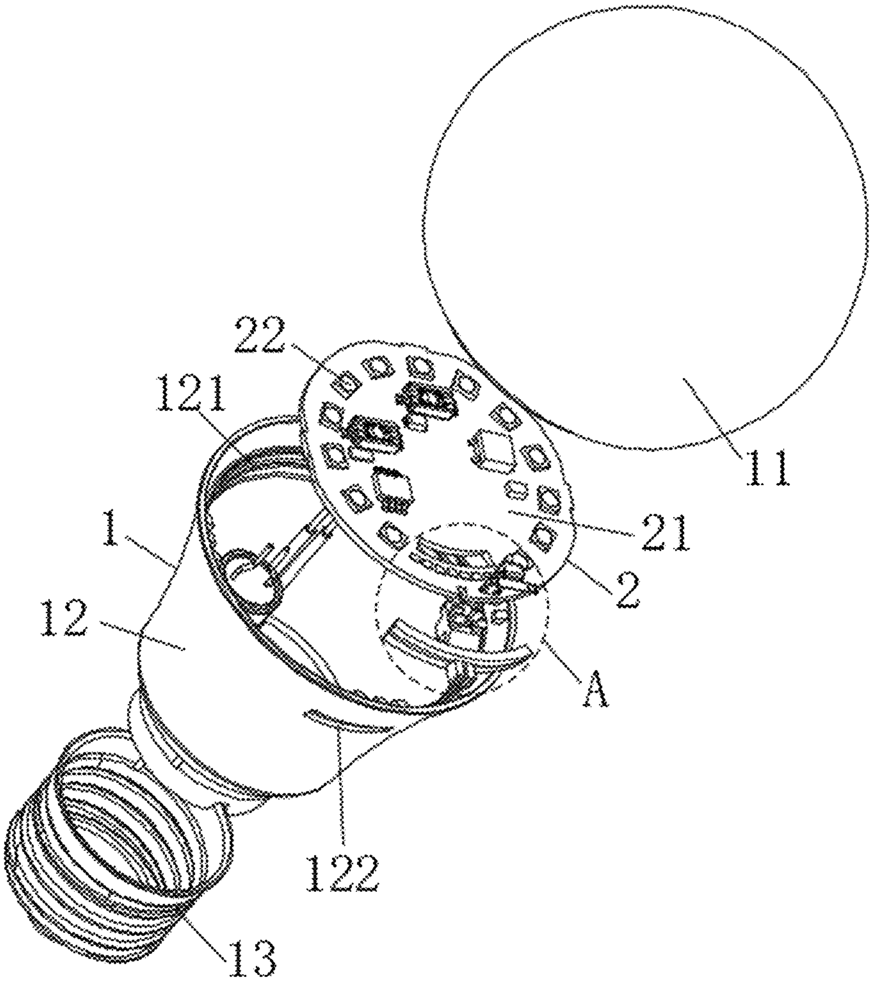
FIG. 1 is a schematic diagram of a split structure of a dial sheet-based dimming lamp according to the present disclosure.
Figure 2:
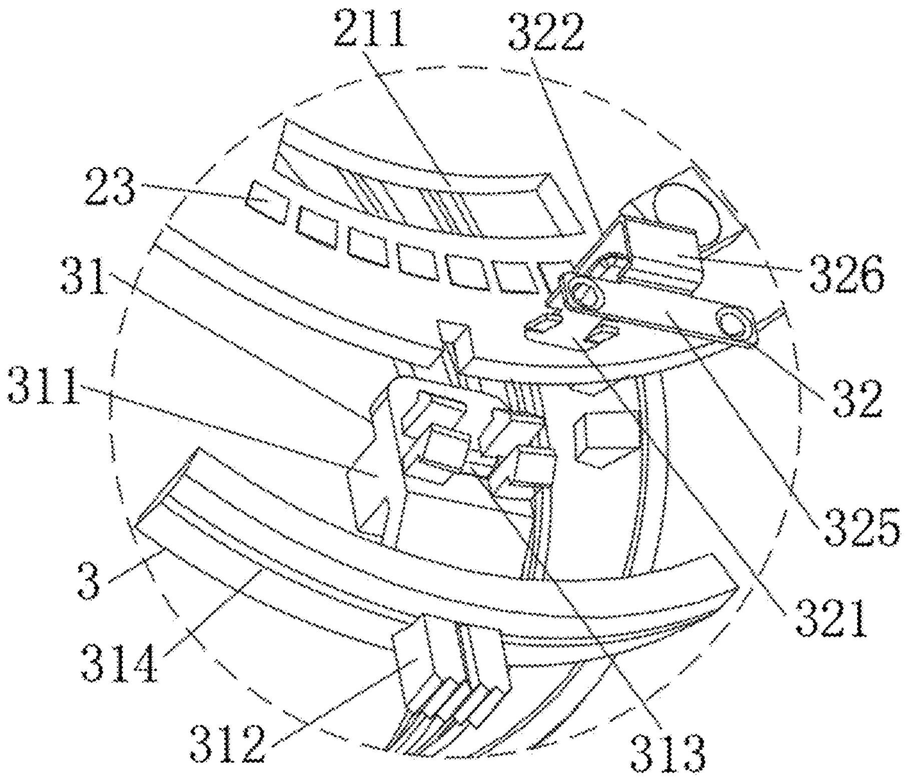
FIG. 2 is a partial enlarged view of A in FIG. 1.

With reference to FIG. 1 and FIG. 2, embodiments of the present disclosure disclose a dial sheet-based dimming lamp, including a housing 1, a light source assembly 2 provided in the housing 1, and an adjustment assembly 3 connected to the light source assembly 2. The housing 1 includes a housing body 12, and the housing 1 wraps and protects the light source assembly 2. The light source assembly 2 includes a light source plate 21 and a light source 22 provided on the light source plate 21. The light source plate 21 fixes the light source 22 and is electrically connected to the light source 22. To adjust the light exit effect of the light source 22 such as color temperature and power, the adjustment assembly 3 includes a dial member 31 and a contact member 32; the dial member 31 is slidably connected to the light source plate 21; the contact member 32 is connected to the dial member 31; the dial member 31 can drive the contact member 32 to move; the contact member 32 abuts against the light source plate 21; connecting contacts 23 are provided on the light source plate 21; there are a plurality of connecting contacts 23; different connecting contacts 23 communicate different electrical loops, and therefore output different currents; the contact member 32 can be in contact with the connecting contacts 23; when the dial member 31 moves, the dial member 31 can drive the contact member 32 to slide between the different connecting contacts 23, such that a current input into the light source 22 changes to achieve the effects of changing the current and adjusting light exit parameters.

The embodiments of the present disclosure have the following beneficial effects:

The dial sheet-based dimming lamp in the embodiments of the present disclosure is provided with a housing 1, a light source assembly 2, and an adjustment assembly 3, where the light source assembly 2 includes a light source plate 21 and a light source 22; the housing 1 includes a housing body 12; the light source plate 21 is fixed into the housing body 12; the adjustment assembly 3 includes a dial member 31 and a contact member 32; the dial member 31 is slidably connected to the light source plate 21; the dial member 31 can slide relative to the housing body 12, and can drive the contact member 32 to slide between connecting contacts 23 of the light source plate 21 in the sliding process; the connecting contacts 23 are connected to a power supply mechanism; the contact member 32 can be in contact with different connecting contacts 23; and since different connecting contacts 23 have different power supply currents, the light exit effect of the light source 22 can be adjusted. In a mode of changing contacts by sliding, the structure is simple, the contacts are provided on the light source plate 21, and there is no protruding structure, such that the overall structure can be simplified, and the overall space can be reduced. Moreover, it is easier to connect the dial member 31 and the contact member 32, so the advantage of mounting convenience is also achieved.

In the embodiments of the present disclosure, the contact member 32 is an elastic sheet, and the elastic sheet has the ability to deform and recover and can be deformed after being subjected to a certain degree of external force and return to its original shape. Moreover, to facilitate electrical conductivity, the used elastic sheet is a metal elastic sheet. The elastic sheet serves as the contact member 32, such that the overall structure can be simplified, the mounting space and the usage space are saved, it is convenient for the elastic sheet to generate continuous and stable contact with the connecting contacts 23 by using the ability to recover, and it is convenient for the elastic sheet to switch between different connecting contacts 23 by using the ability to deform. The contact member 32 is provided with sliding contacts (441, 442), and the sliding contacts (441, 442) can be in contact with the connecting contacts 23. The contact member 32 can be electrically conductive as a whole, so different power supply loops can be switched by sliding the sliding contacts (441, 442) between different connecting contacts 23.

Specifically, with reference to FIG. 2, the dial member 31 includes a connecting portion 311 and a dial sheet portion 312. A connecting hole 313 is formed in the connecting portion 311, and the contact member 32 can be inserted into the connecting hole 313 for fixed limiting. Therefore, the dial member 31 can drive the contact member 32 to move. The contact member 32 is connected to the dial member 31 in an insertion manner, such that the structure is simple, and the mounting and the disassembly are facilitated. The dial sheet portion 312 has one end connected to the connecting portion 311 and the other end protruding towards anouter side of the housing body 12. When the adjustment is required, by shifting the dial sheet portion 312, the connecting portion 311 and the contact member 32 in the connecting portion 311 can be driven to move. A sliding hole 211 is formed in the light source plate 21, and a length direction of the sliding hole 211 is parallel to a length direction of the adjustment hole 122. That is, the projection of an extension trajectory of the sliding hole 211 on a plane where the adjustment hole 122 is located does not overlap an extension trajectory of the adjustment hole 122. The sliding hole 211 and the adjustment hole 122 are both parallel to the surface of the light source plate 21. The connecting portion 311 can be inserted into the sliding hole 211 and slides in the sliding hole 211. The connecting portion 311 is slidably connected to the sliding hole 211. The sliding hole 211 can limit a sliding direction of the connecting portion 311.

An adjustment hole 122 is formed in a side wall of the housing body 12, the adjustment hole 122 is a long hole, and a length direction of the adjustment hole 122 is parallel to the surface of the light source plate 21. The dial sheet portion 312 passes through the adjustment hole 122 and protrudes from anouter side wall of the housing body 12, and therefore, during adjustment, the dial sheet portion 312 is shifted to move in the adjustment hole 122. Since the length direction of the adjustment hole 122 is parallel to the surface of the light source plate 21, the movement direction of the dial sheet portion 312 and the connecting portion 311 is parallel to the surface of the light source plate 21. Preferably, in the embodiments of the present disclosure, the connecting portion 311 moves on the surface of the light source plate 21, and thus the connecting portion 311 can make full use of the surface space of the light source plate 21 to move, without occupying additional movement space, such that the overall volume of the adjustment assembly 3 can be reduced.

With reference to FIG. 2, to further guide the movement of the dial member 31 and avoid jamming and tripping, the dial member 31 further includes a guide rod 314, the guide rod 314 is disposed at an end of the dial sheet portion 312 located in the housing body 12, a shape of the guide rod 314 corresponds to a shape of an inner side wall of the housing body 12, and therefore aside portion of the guide rod 314 can abut against the inner side wall of the housing body 12. When the dial member 31 is shifted to drive the contact member 32 to move, the guide rod 314 can slide along the inner side wall of the housing body 12. The guide rod 314 and the housing body 12 interact to limit the movement trajectory of the dial member 31, such that the dial member 31 can move only along the inner side wall of the housing body 12. Specifically, the movement direction of the dial member 31 is a horizontal direction, the inner side wall of the housing body 12 is an arc-shaped surface, the dial member 31 can swing in the horizontal direction around the central axis of the housing body 12, and the guide rod 314 ensures the swing height and direction of the dial member 31.

Figure 4:
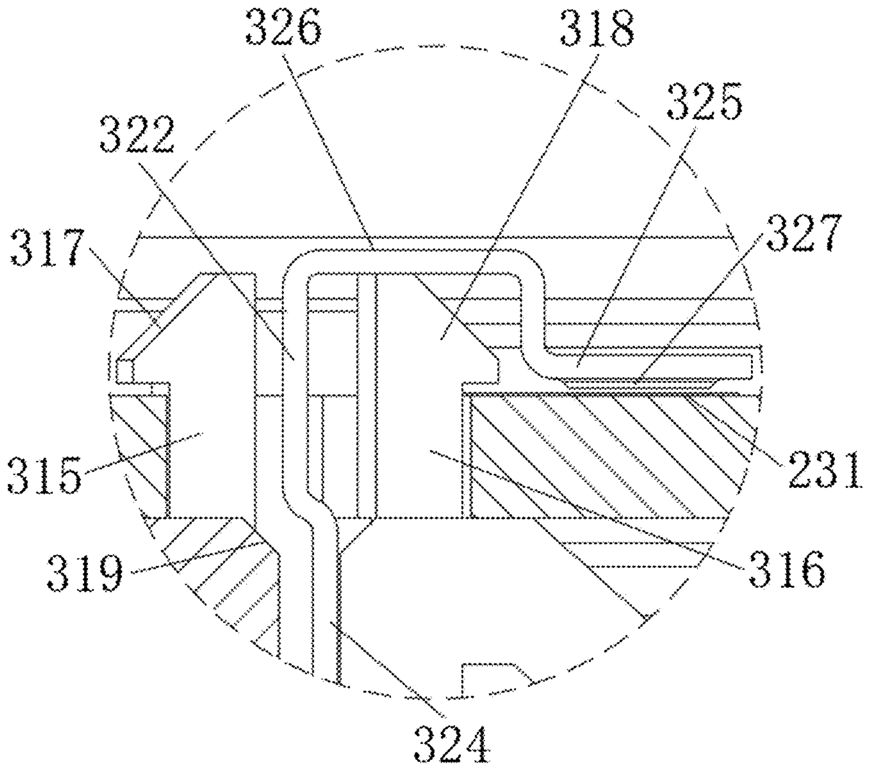
FIG. 4 is a partial enlarged view of B in FIG. 3.

Furthermore, with reference to FIG. 4, the connecting portion 311 is provided with a first limiting plate 315 and a second limiting plate 316, the first limiting plate 315 and the second limiting plate 316 protrude from a surface of the connecting portion 311, the first limiting plate 315 and the second limiting plate 316 are respectively located on two opposite sides of the connecting hole 313. The first limiting plate 315 is located on aside of the connecting hole 313 close to a center of the housing body 12, and the second limiting plate 316 is located on aside of the connecting hole 313 away from the center of the housing body 12. The first limiting plate 315 and the second limiting plate 316 can be inserted into the sliding hole 211, the first limiting plate 315 and the second limiting plate 316 respectively abut against two opposite sides of the sliding hole 211, and the first limiting plate 315 and the second limiting plate 316 can move along the surface of the light source plate 21. The sliding hole 211 limits the first limiting plate 315 and the second limiting plate 316. Thus, when the dial member 31 moves, the first limiting plate 315 and the second limiting plate 316 can slide under the limiting of the sliding hole 211.

The adjustment hole 122 limits the movement of the dial sheet portion 312, the sliding hole 211 limits the movement of the connecting portion 311 through the first limiting plate 315 and the second limiting plate 316, and the length direction of the sliding hole 211 is parallel to the length direction of the adjustment hole 122. While it is ensured that two ends of the dial member 31 can smoothly move in the same direction, the sliding hole 211, the first limiting plate 315, and the second limiting plate 316 further ensure that the contact member 32 in the connecting hole 313 can continuously abut against the light source plate 21.

With reference to FIG. 4, a first buckling stage 317 is provided at a tail end of the first limiting plate 315, the first buckling stage 317 protrudes towards a direction away from the connecting hole 313 and is inclined from aside away from the center of the housing body 12 to aside close to the center of the housing body 12, a second buckling stage 318 is provided at a tail end of the second limiting plate 316, and the second buckling stage 318 protrudes towards the direction away from the connecting hole 313 and is inclined from aside close to the center of the housing body 12 to aside away from the center of the housing body 12. The first buckling stage 317 and the second buckling stage 318 have triangular longitudinal sections and opposite inclination directions. After the first limiting plate 315 and the second limiting plate 316 are inserted into the sliding hole 211, the first buckling stage 317 and the second buckling stage 318 both can abut against the surface of the light source plate 21. Therefore, when the first limiting plate 315 and the second limiting plate 316 slide in the sliding hole 211, the sliding hole 211 forms limiting in the horizontal direction, and the first buckling stage 317 and the second buckling stage 318 form limiting in the vertical direction.

The arrangement of the first buckling stage 317 and the second buckling stage 318 further facilitates the mounting and the disassembly. Specifically, when the dial member 31 and the light source plate 21 are connected, the first buckling stage 317 and the second buckling stage 318 first abut against the sliding hole 211 and are inserted into the sliding hole 211. Since the first buckling stage 317 protrudes towards the direction away from the connecting hole 313 and is inclined from the side away from the center of the housing body 12 to the side close to the center of the housing body 12, and the second buckling stage 318 protrudes towards the direction away from the connecting hole 313 and is inclined from the side close to the center of the housing body 12 to the side away from the center of the housing body 12, the first buckling stage 317 and the second buckling stage 318 form an insertion structure. The width of the insertion structure gradually narrows from the positions of the first limiting plate 315 and the second limiting plate 316 to the top, and therefore, the insertion structure is conveniently inserted into the sliding hole 211. The sliding hole 211 has a reactive force for the first buckling stage 317 and the second buckling stage 318, and the distance between the first buckling stage 317 and the second buckling stage 318 is narrowed as the depth of inserting into the sliding hole 211 increases, thereby further improving the convenience of inserting into the sliding hole 211. After completing insertion into the sliding hole 211, the first buckling stage 317 and the second buckling cross over the sliding hole 211 to abut against the surface of the light source plate 21 to form limiting in the vertical direction, and the first limiting plate 315 and the second limiting plate 316 abut against the two sides of the sliding hole 211 to form limiting in the horizontal direction. When the disassembly is required, the first buckling stage 317 and the second buckling stage 318 are extruded from the outer side to approach each other, and the width of the insertion structure formed by the first buckling stage 317 and the second buckling stage 318 is reduced, such that the limiting in the vertical direction can be released, and the first buckling stage 317 and the second buckling stage 318 can be pulled out.

With reference to FIG. 4, the contact member 32 includes an insertion portion 321 and a fixing portion 322, and the insertion portion 321 is located at a tail end of the fixing portion 322. In the embodiments of the present disclosure, the contact member 32 is a single component. The insertion portion 321 and the fixing portion 322 are manufactured through an integral forming process such as local punching and local bending. Two sides of the insertion portion 321 are each provided with a limiting sheet 323, and the limiting sheet 323 has one end connected to the insertion portion 321 and the other end extending obliquely towards the fixing portion 322 and the outer side of the insertion portion 321. The insertion portion 321 is inserted into the connecting hole 313 to form connection. The limiting sheet 323 can form clamping with the connecting hole 313. An inclined surface 319 is provided in an opening at one end of the connecting hole 313, an inclination direction of the inclined surface 319 is the same as an inclination direction of the limiting sheet 323. After the insertion portion 321 is inserted into the connecting hole 313, one end of the limiting sheet 323 can abut against an end of the connecting portion 311 away from the inclined surface 319 to prevent the insertion portion 321 from escaping, and therefore the limiting sheet 323 and the connecting hole 313 can form limiting in the vertical direction. The inclined surface 319 can conveniently extrude the limiting sheet 323 to reduce the inclination degree of the limiting sheet 323, such that the insertion portion 321 is conveniently inserted into the connecting hole 313 as a whole. After the insertion portion 321 is inserted into the connecting hole 313, a limiting boss 324 is provided at a side portion of the fixing portion 322, the limiting boss 324 protrudes outwards and can abut against the inside of the connecting hole 313, and therefore the limiting boss 324 and the connecting hole 313 form limiting in the horizontal direction.

Figure 5:
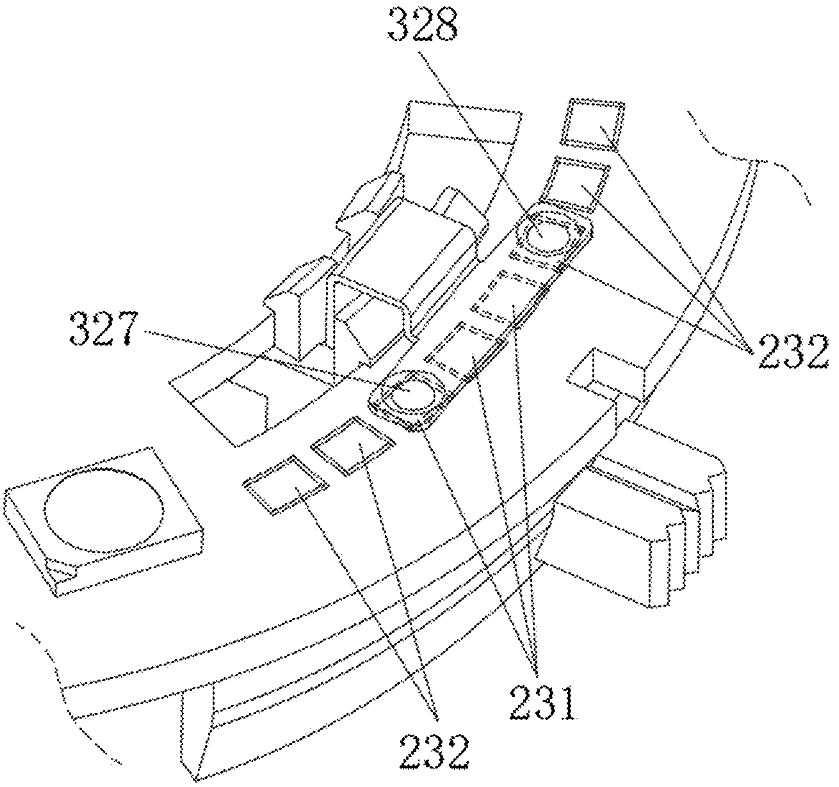
FIG. 5 is a schematic diagram of a local structure of contact between a contact member and a light source plate according to the present disclosure.

With reference to FIG. 2 and FIG. 5, the contact member 32 further includes a contact sheet 325 and a connecting sheet 326. The contact sheet 325 is connected to the fixing portion 322 through the connecting sheet 326, and the connecting sheet 326 is located at the end of the fixing portion 322 away from the insertion portion 321. Sliding contacts (327, 328) are provided on the contact sheet 325, and the sliding contacts (327, 328) include a first movable contact 327 and a second movable contact 328. The contact sheet 325 is made of a conductive material, and therefore, the first movable contact 327 and the second movable contact 328 are electrically conductive. A plurality of groups of connecting contacts 23 are provided on the light source plate 21. Each group of connecting contacts 23 includes a first fixed contact 231 and a second fixed contact 232. Each group of the first fixed contact 231 and the second fixed contact 232 can form a normally open circuit with a power supply mechanism. The first fixed contact 231 and the second fixed contact 232 are equivalent to switches of a normally open electrical loop. Electrical loops formed by each group of connecting contacts 23 have different currents. In the process of the dial member 31 driving the contact member 32 to move, the first movable contact 327 and the second movable contact 328 can be in contact with each group of the first fixed contact 231 and the second fixed contact 232, such that different electrically loops form a pathway, and a power supply current of the power supply 22 is changed by switching different electrical loops to achieve the effect of adjustment. The number of first fixed contacts 231 and the number of second fixed contacts 232 are not necessarily equal. By reasonably setting the distance between the first movable contact 327 and the second movable contact 328, when the first movable contact 327 is in contact with the first fixed contact 231, the second movable contact 328 is connected to the second fixed contact 232, and when the first movable contact 327 is in contact with the second fixed contact 232, the second movable contact 328 is connected to the first fixed contact 231.

With reference to FIG. 5, to further save the space, a plurality of groups of the first fixed contacts 231 and the second fixed contacts 232 are distributed on a same side of the sliding hole 211, the contact sheet 325 extends to a same end of the connecting sheet 326, and the first movable contact 327 and the second movable contact 328 are respectively disposed on two opposite sides of the same end of the connecting sheet 326. In the embodiments of the present disclosure, a plurality of first fixed contacts 231 and second fixed contacts 232 are arranged along the edge of the light source plate 21, the plurality of first fixed contacts 231 are disposed among the plurality of second fixed contacts 232, and the first movable contact 327 and the second movable contact 328 are switched between the plurality of first fixed contacts 231 and the plurality of second fixed contacts 232.

Figure 3:
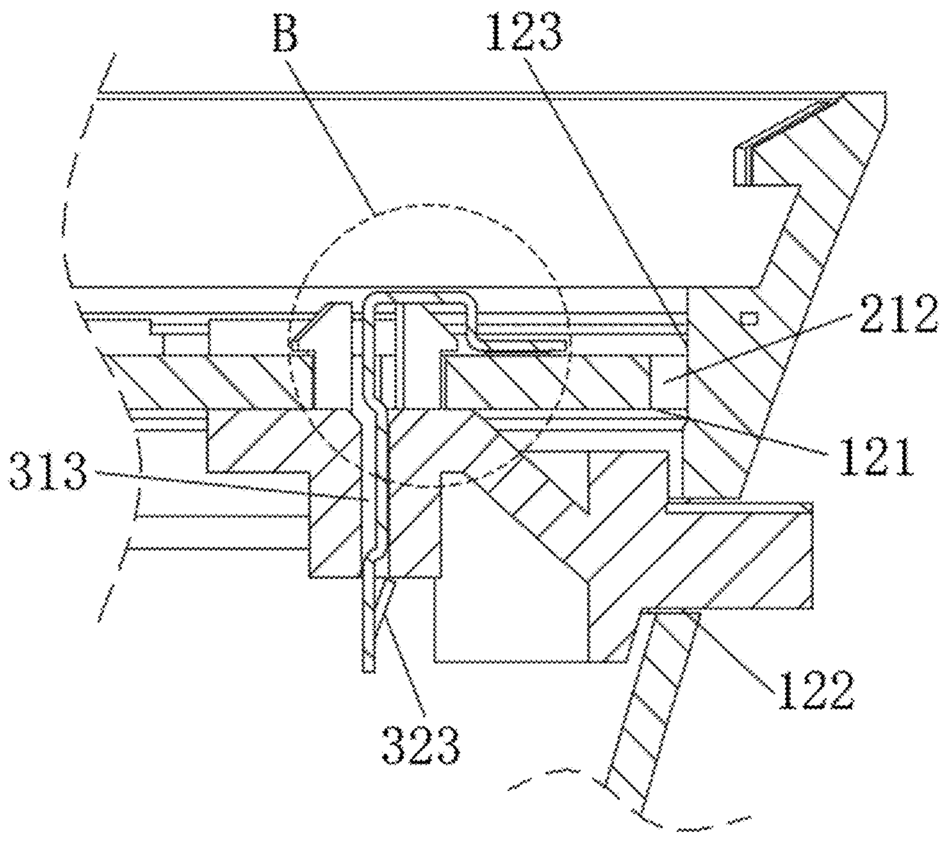
FIG. 3 is a schematic diagram of a local sectional structure of a dial sheet-based dimming lamp according to the present disclosure.

With reference to FIG. 3, to fix the light source plate 21, a mounting stage 121 is provided on the inner side wall of the housing body 12, the mounting stage 121 is of a stepped structure capable of carrying the light source plate 21, and the light source plate 21 is fixed on the mounting stage 121 to form fixation. Furthermore, since the connecting portion 311 generates an acting force on the light source plate 21 when moving on the surface of the light source plate 21, to prevent the light source plate 21 from rotating, a limiting piece 123 is further provided on the mounting stage 121, a limiting groove 212 is formed in the light source plate 21, and the limiting piece 123 can be inserted into the limiting groove 212 to limit the light source plate 21, such that the connecting portion 311 can be prevented from driving the light source plate 21 to rotate in the movement process, and smooth movement of the connecting portion 311 is also ensured.

In addition, the housing 1 further includes a lampshade 11 and a threaded cylinder 13, the lampshade 11 is connected to one end of the housing body 12, the lampshade 11 scatters light and protects the light source assembly 2, the threaded cylinder 13 is connected to the end of the housing body 12 away from the lampshade 11, and the threaded cylinder 13 is configured to fix the lamp and electrically connected to the lamp.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

The invention claimed is:

1. A lamp comprising:

a housing body;

a light source assembly provided in the housing body, and including a light source plate and a light source provided on the light source plate;

an adjustment assembly including a dial member slidably connected to the light source plate, and a contact member connected to the dial member and abutting against the light source plate;

connecting contacts provided on the light source plate, wherein the contact member is configured to contact the connecting contacts, and the dial member is configured for driving the contact member to slide between different connecting contacts;

wherein the dial member comprises a connecting portion, the contact member is provided with an insertion portion, the connecting portion is provided with a connecting hole, and the insertion portion is configured to be inserted into the connecting hole; and wherein two sides of the insertion portion are each provided with a limiting sheet, the limiting sheet has one end connected to the insertion portion and other end extending obliquely towards an outer side of the connecting hole and towards an outer side of the insertion portion, an inclined surface is provided in an opening at one end of the connecting hole, an inclination direction of the inclined surface is the same as an inclination direction of the limiting sheet, and one end of the limiting sheet is configured to abut against an end of the connecting portion away from the inclined surface.

2. The lamp according to claim 1, wherein a mounting stage is provided on an inner side wall of the housing body, the light source plate is fixed on the mounting stage, a limiting piece is further provided on the mounting stage, a limiting groove is formed in the light source plate, and the limiting piece is configured to be inserted into the limiting groove.

3. The lamp according to claim 1, wherein the housing further comprises a lampshade and a threaded cylinder, the lampshade is connected to one end of the housing body, and the threaded cylinder is connected to the other end of the housing body.

4. The lamp according to claim 1, wherein the contact member is an elastic sheet, and the contact member is inserted on the dial member.

5. The lamp according to claim 4, wherein the contact member is provided with sliding contacts, and the sliding contacts are configured to be in contact with the connecting contacts.

6. A lamp comprising:

a housing body:

a light source assembly provided in the housing body, and including a light source plate and a light source provided on the light source plate;

an adjustment assembly including a dial member slidably connected to the light source plate, and a contact member connected to the dial member and abutting against the light source plate; and connecting contacts provided on the light source plate, wherein the contact member is configured to contact the connecting contacts, and the dial member is configured for driving the contact member to slide between different connecting contacts;

wherein the dial member comprises a connecting portion, the contact member is provided with an insertion portion, the connecting portion is provided with a connecting hole, and the insertion portion is configured to be inserted into the connecting hole; and wherein a sliding hole is formed in the light source plate, a length direction of the sliding hole is parallel to a surface of the light source plate, and the connecting portion is configured to be inserted into the sliding hole and slide in the sliding hole.

7. The lamp according to claim 6, wherein the contact member is an elastic sheet, and the contact member is inserted on the dial member.

8. The lamp according to claim 6, wherein the contact member is provided with sliding contacts, and the sliding contacts are configured to be in contact with the connecting contacts.

9. The lamp according to claim 6, wherein a mounting stage is provided on an inner side wall of the housing body, the light source plate is fixed on the mounting stage, a limiting piece is further provided on the mounting stage, a limiting groove is formed in the light source plate, and the limiting piece is configured to be inserted into the limiting groove.

10. The lamp according to claim 6, wherein the dial member further comprises a dial sheet portion, and the dial sheet portion has one end connected to the connecting portion and the other end protruding towards an outer side of the housing body.

11. The lamp according to claim 10, wherein an adjustment hole is formed in a side wall of the housing body, a length direction of the adjustment hole is parallel to the length direction of the sliding hole, the dial sheet portion passes through the adjustment hole and protrudes from an outer side wall of the housing body, and the connecting portion moves on the surface of the light source plate.

12. The lamp according to claim 10, wherein the dial member further comprises a guide rod, the guide rod is disposed at an end of the dial sheet portion located in the housing body, a shape of the guide rod corresponds to a shape of an inner side wall of the housing body, aside portion of the guide rod abuts against the inner side wall of the housing body, and the guide rod is configured to slide along the inner side wall of the housing body.

13. The lamp according to claim 6, wherein the connecting portion is provided with a first limiting plate and a second limiting plate, the first limiting plate and the second limiting plate protrude from a surface of the connecting portion, the first limiting plate is located on aside of the connecting hole close to a center of the housing body, and the second limiting plate is located on aside of the connecting hole away from the center of the housing body.

14. The lamp according to claim 13, wherein the first limiting plate and the second limiting plate are configured to be inserted into the sliding hole, the first limiting plate and the second limiting plate respectively abut against two opposite sides of the sliding hole, and the first limiting plate and the second limiting plate are configured to slide in the sliding hole.

15. The lamp according to claim 14, wherein a first buckling stage is provided at a tail end of the first limiting plate, the first buckling stage protrudes towards a direction away from the connecting hole and is inclined from aside away from the center of the housing body to aside close to the center of the housing body, a second buckling stage is provided at a tail end of the second limiting plate, the second buckling stage protrudes towards the direction away from the connecting hole and is inclined from aside close to the center of the housing body to aside away from the center of the housing body, and the first buckling stage and the second buckling stage are both configured to abut against the surface of the light source plate.

16. A lamp comprising:

a housing body;

a light source assembly provided in the housing body, and including a light source plate and a light source provided on the light source plate;

an adjustment assembly including a dial member slidably connected to the light source plate, and a contact member connected to the dial member and abutting against the light source plate; and connecting contacts provided on the light source plate, wherein the contact member is configured to contact the connecting contacts, and the dial member is configured for driving the contact member to slide between different connecting contacts;

wherein the dial member comprises a connecting portion, the contact member is provided with an insertion portion, the connecting portion is provided with a connecting hole, and the insertion portion is configured to be inserted into the connecting hole; and wherein the contact member further comprises a fixing portion, the insertion portion is located at a tail end of the fixing portion, a limiting boss is provided at a side portion of the fixing portion, and the limiting boss protrudes outwards and is configured to abut against the inside of the connecting hole.

17. The lamp according to claim 16 wherein the contact member is an elastic sheet, and the contact member is inserted on the dial member.

18. The lamp according to claim 16, wherein the contact member is provided with sliding contacts, and the sliding contacts are configured to be in contact with the connecting contacts.

19. The lamp according to claim 16, wherein the contact member further comprises a contact sheet and a connecting sheet; the contact sheet is connected to the fixing portion through the connecting sheet; the sliding contacts are disposed on the contact sheet; the sliding contacts comprise a first movable contact and a second movable contact; a plurality of groups of connecting contacts are provided on the light source plate; each group of connecting contacts comprises a first fixed contact and a second fixed contact; when the first movable contact is in contact with the first fixed contact, the second movable contact is connected to the second fixed contact; and when the first movable contact is in contact with the second fixed contact, the second movable contact is in contact with the first fixed contact.

20. The lamp according to claim 19, wherein the first fixed contact and the second fixed contact are distributed on a same side of the sliding hole, and the first movable contact and the second movable contact are respectively disposed on two sides of a same end of the connecting sheet.

* * * * *